(12) United States Patent
Manes et al.

(10) Patent No.: US 6,438,448 B1
(45) Date of Patent: Aug. 20, 2002

(54) SELF ALIGNING ROBOTIC ARM CALIBRATION APPARATUS

(75) Inventors: Joseph Paul Manes, Arvada; David Black, Thornton; Dan Plutt, Superior, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/499,925

(22) Filed: Feb. 8, 2000

(51) Int. Cl.[7] .............................. G06F 7/00; G05B 15/00; G05B 19/00
(52) U.S. Cl. .................. 700/218; 700/214; 700/259; 901/46
(58) Field of Search ................................. 700/213, 214, 700/220, 254, 259, 218; 356/375, 399, 620; 414/273, 274; 901/46, 47

(56) References Cited

U.S. PATENT DOCUMENTS

| | | | | |
|---|---|---|---|---|
| 4,908,777 A | * | 3/1990 | Wolfe | 901/46 X |
| 4,967,370 A | * | 10/1990 | Stern et al. | 901/46 X |
| 5,034,904 A | * | 7/1991 | Moy | 700/259 X |
| 5,237,468 A | * | 8/1993 | Ellis | 360/92 X |
| 5,303,034 A | | 4/1994 | Carmichael et al. | 356/375 |
| 5,479,581 A | * | 12/1995 | Kleinschnitz | 700/213 X |
| 5,535,306 A | * | 7/1996 | Stevens | 395/89 X |
| 5,598,207 A | * | 1/1997 | Meisser et al. | 901/47 X |
| 5,661,287 A | * | 8/1997 | Schaeffer et al. | 235/462 X |
| 5,848,872 A | | 12/1998 | Manes et al. | 414/753 |

* cited by examiner

*Primary Examiner*—Christopher P. Ellis
*Assistant Examiner*—Gene O. Crawford
(74) *Attorney, Agent, or Firm*—Carstens, Yee & Cahoon, L.L.P.

(57) ABSTRACT

A calibration apparatus for use with a storage system for storing a plurality of objects in an array of object storage locations. In a preferred embodiment, the calibration apparatus includes a target affixed in a predetermined location to the storage system, an object retrieval mechanism, and an imaging system. The object retrieval mechanism is used for retrieving objects from the object storage locations and has a principal direction of movement which is perpendicular to a plane in which an exposed surface of each of the plurality of objects lie. The imaging system is attached to the object retrieval mechanism for imaging the target. The imaging system is positioned such that the direction from the target to the imaging system is parallel to the principal direction.

19 Claims, 10 Drawing Sheets

SELF ALIGNING ROBOTIC ARM CALIBRATION APPARATUS

BACKGROUND OF THE INVENTION

1. Technical Field

The present invention relates generally to an apparatus for calibrating an apparatus for retrieving objects from an array of storage cells.

2. Description of Related Art

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a movable arm. To retrieve information, the robotic arm is moved to position the hand near the inventory location of a desired media cartridge. The hand is then activated to grip the desired cartridge and remove it from the library inventory location. The robotic arm with the hand gripping the cartridge then moves to an appropriate position to further process the cartridge. In this manner, the robotic hand manipulates the cartridge for access to information stored on the cartridge.

However, in order to grip the cartridge, the position of the robotic arm with respect to the cartridge within the library must be determined. Positional accuracy of the robotic arm and any devices attached thereto affects both the repeatability of an operation as well as the ability of the robotic arm to accurately perform the particular task required of it. There are many different arm calibration arrangements known in the art, and many of these entail the use of some sort of sensor to determine the position of the robotic arm.

A common method of calibrating the position of the robotic arm gripper mechanism is to use a vision system to orient the robotic arm with respect to one or more baseline targets located in the work space. Often these vision systems are located underneath or above the robotic arm and are oriented at an angle relative to the robotic arm. These vision systems are located at an angle so that a target on the work space can be imaged, and then a target located on a part of the robotic arm that is extended into the field of view of the vision system is imaged. The two images are compared and the position of the robotic arm is adjusted such that the target on the robotic arm is aligned with the target on the work piece when extended.

However, orienting the vision system at an angle causes the inclusion of the vision system with the robotic arm to take up a large amount of space. Thus, a significant portion of the space within the storage library system is unusable for placing storage cells. This is due to the fact that if, for example, the vision system is located below the robotic arm, an amount of space equal to the height or thickness of the angled vision system at the bottom of the storage retrieval system cannot be accessed by the robotic arm since the vision system comes into contact with the floor of the storage library system before the robotic arm. Thus the robotic arm is prevented from going low enough within the storage library system to engage and retrieve an object stored in a storage cell located within the thickness of the angled vision system from the floor of the storage library system.

However, as the need to store more and more data increases and the price paid for space also increases, the amount of money necessary to store data is increased. Thus, the wasted space within a library storage system becomes more and more intolerable. Therefore, there is a need for a calibration system that requires less space than current systems and that allows for a denser concentration of storage cells within a storage library system.

SUMMARY OF THE INVENTION

The present invention provides a calibration apparatus for use with a storage system for storing a plurality of objects in an array of object storage locations. In a preferred embodiment, the calibration apparatus includes a target affixed in a predetermined location to the storage system, an object retrieval mechanism, and an imaging system. The object retrieval mechanism is used for retrieving objects from the object storage locations and has a principal direction of movement which is perpendicular to a plane in which an exposed surface of each of the plurality of objects lie. The imaging system is attached to the object retrieval mechanism for imaging the target. The imaging system is positioned such that the direction from the target to the imaging system is parallel to the principal direction. Thus, the thickness of the housing for the imaging system for the present invention is reduced over that needed to hold the imaging system in the prior art.

In another embodiment, the calibration apparatus includes an object retrieval mechanism, a calibration block, a first sensor, and a second sensor. The object retrieval mechanism is configured to retrieve objects from object storage locations within a library storage system. The calibration block is configured to receive a portion of the object retrieval mechanism. The first sensor on the calibration block determines the position of the object retrieval mechanism with respect to the calibration block in a first direction and the second sensor on the calibration block determines the position of the object retrieval of the object retrieval mechanism with respect to the calibration block in a second direction. The first and second directions are substantially orthogonal to each other.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
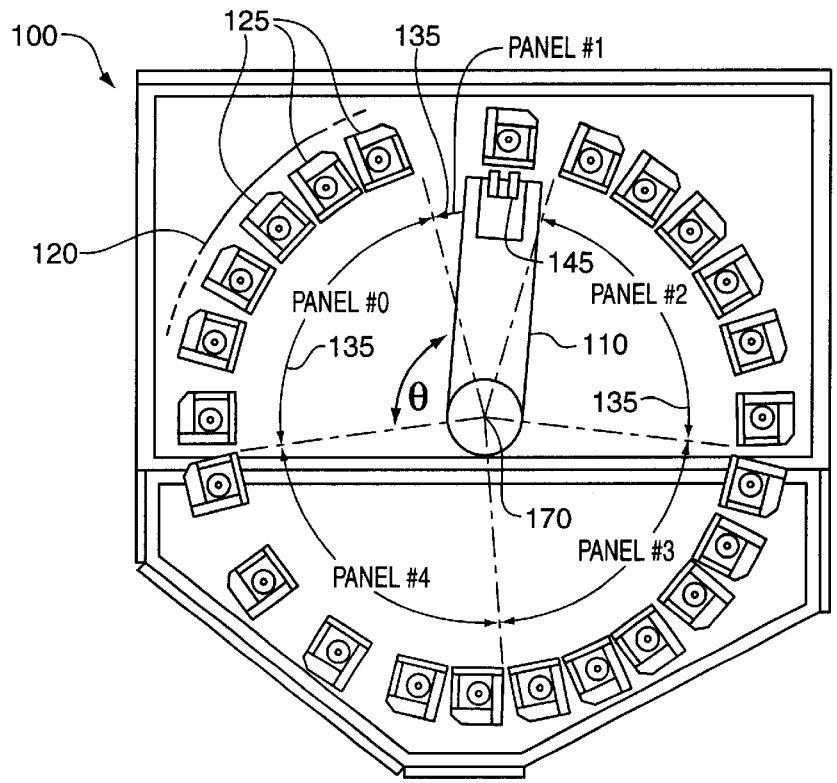
FIG. 1 depicts a top view of the overall architecture of a typical automated robotic tape library system wherein the calibration system of the present invention may be employed.

With reference now to the Figures and, in particular, with reference to FIG. 1, a top view of the overall architecture of a typical automated robotic tape library system 100 wherein the calibration system of the present invention is employed is depicted. A typical automated library system operates to store and retrieve a large number of magnetic tape cartridges for an associated host processor. Library system 100 includes an array 120 of circularly arranged cells 130 for storing magnetic tape cartridges. A robotic arm 110 is pivotally rotatable about the center of array 120 and contains a tape cartridge retrieval mechanism 145.

Figure 2:
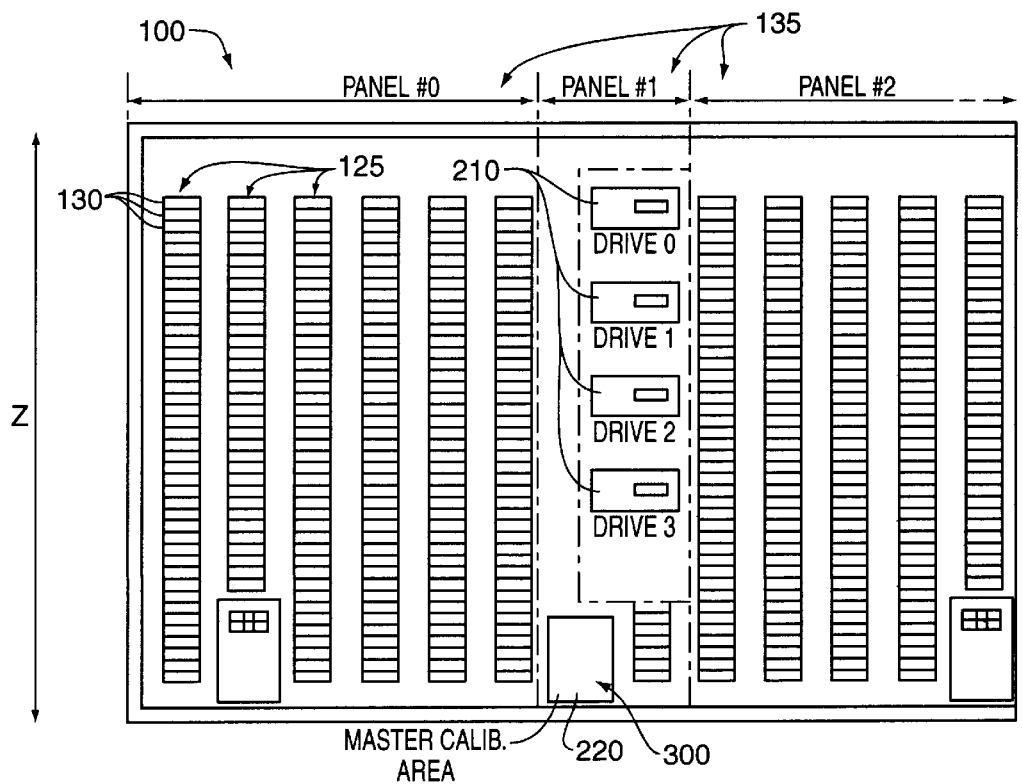
FIG. 2 depicts a side view of a segment of the library system depicted in FIG. 1 in accordance with the present invention.

Referring now to FIG. 2, a side view of a segment of library system 100 is depicted in accordance with the present invention. Tape cartridge retrieval mechanism 145 is located in a position for retrieving and replacing tape cartridges in the tape cartridge storage cells 130. The retrieved tape cartridges are loaded into a tape transport mechanism (tape drives) 210 in response to a read/write request from a host computer (not shown) which is connected to library system 100. Tape cartridge storage cells 130 and tape drives 210 are arranged in columns 125 which are grouped in "panels" 135.

Figure 3:
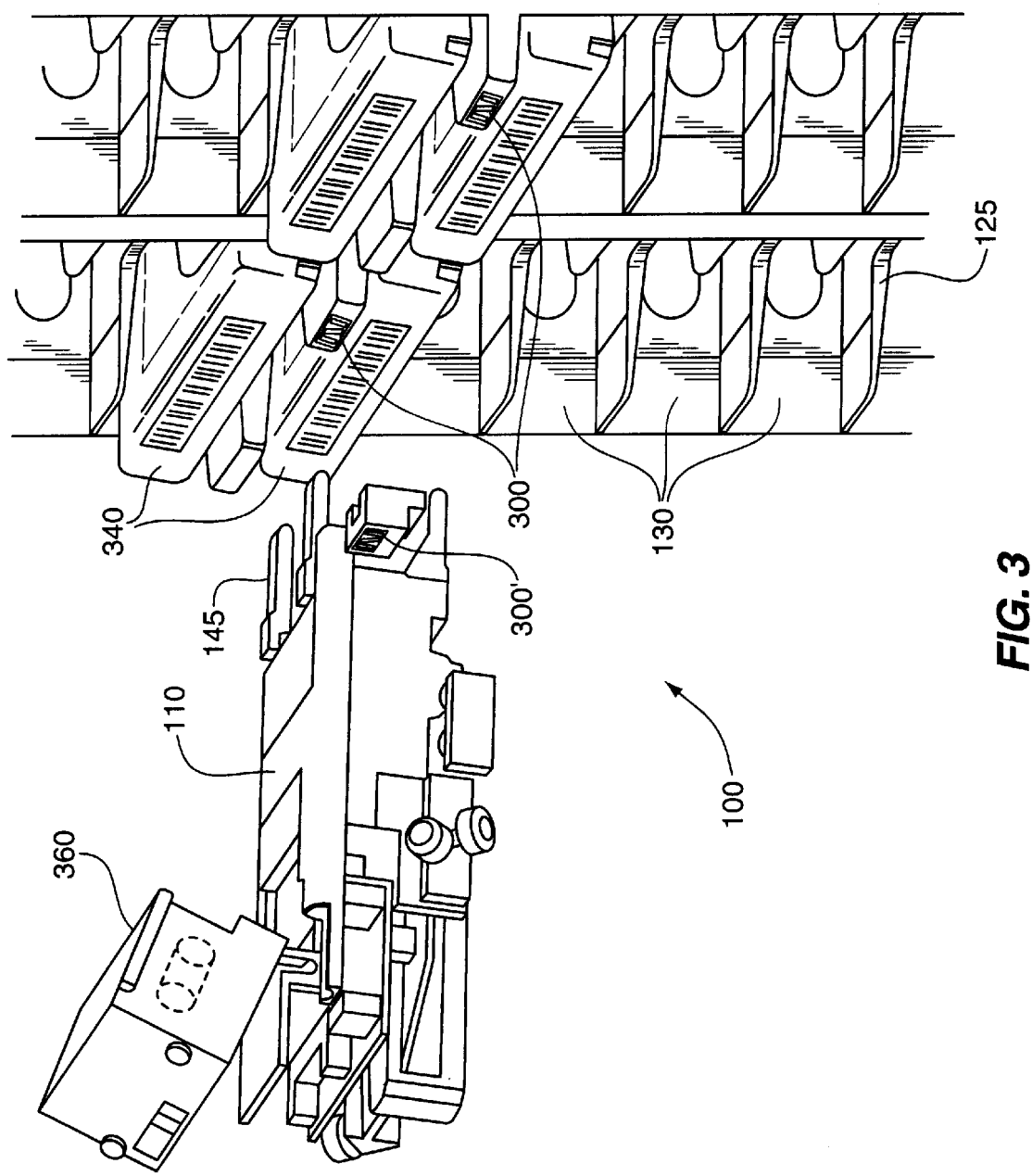
FIG. 3 depicts a perspective cutaway view of a tape library system showing several of the plurality of locations of a target.
Figure 4:
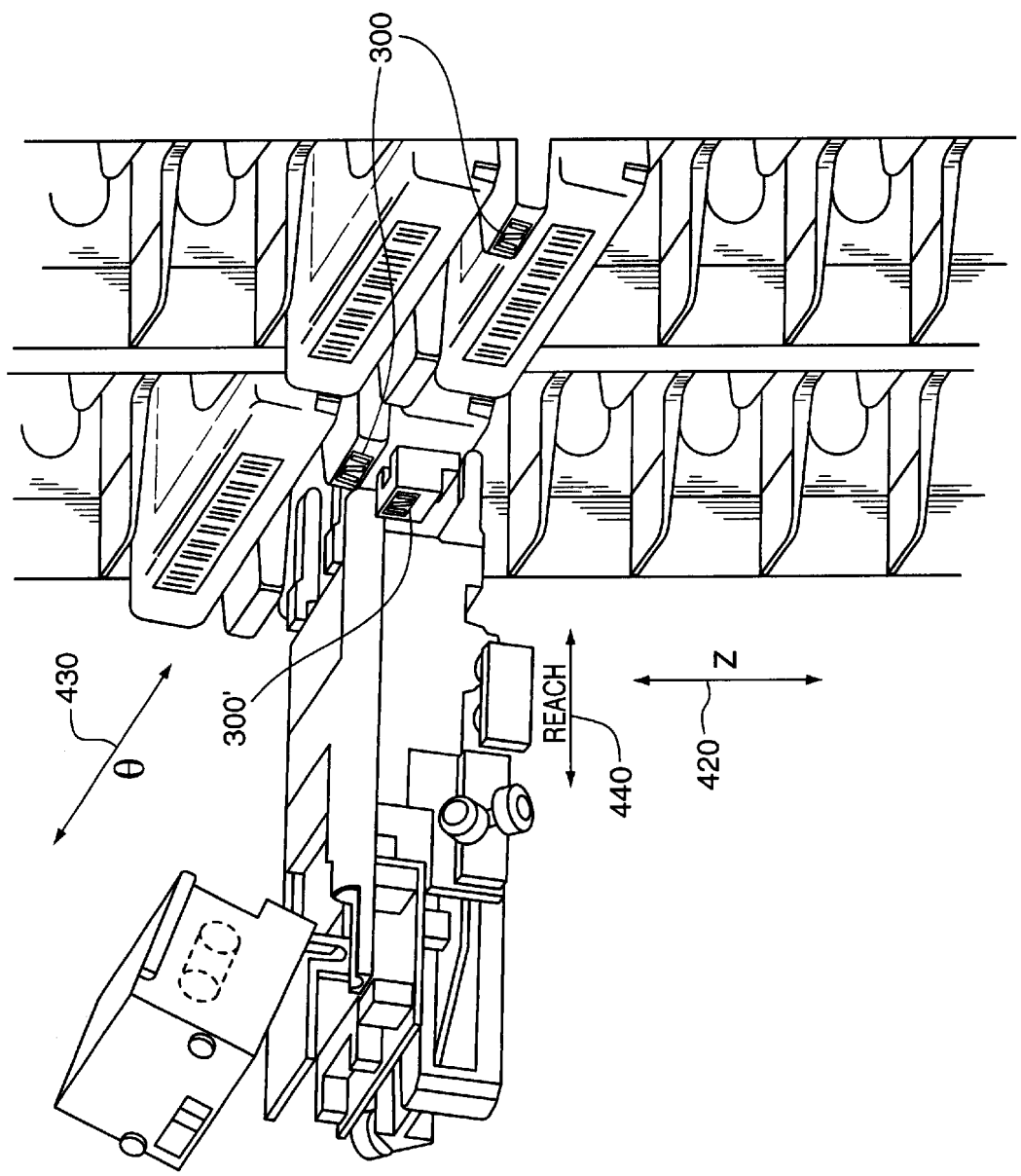
FIG. 4 illustrates the environment shown in FIG. 3 wherein the robotic arm retrieval mechanisms is grasping a tape cartridge with the robotic arm target positioned in close proximity to a cartridge cell.

Referring now to FIGS. 3 and 4, perspective cutaway views of a prior art robotic arm and storage cells suitable for use with tape library system 100 are depicted. FIG. 3 shows a perspective cutaway view of a tape library system showing several of the plurality of locations of target 300.

In the prior art, one or more "N"-shaped calibration targets 300 are located on each column 125 of tape cartridge storage cells 130. The position of the robotic arm 110 with respect to the tape cartridge storage cells 130 is determined and adjusted by using a line scan camera vision system 360 to scan these calibration targets 300 located in each of the columns 125. An "N"-shaped target 300' located on the cartridge retrieval mechanism 145 is also used to calibrate the position of the camera 360 with respect to the cartridge retrieval mechanisms 145.

FIG. 4 illustrates the environment shown in FIG. 3 wherein the robotic arm retrieval mechanisms shown in FIG. 3 is grasping a tape cartridge 340 with the robotic arm target 300 positioned in close proximity to a cartridge cell.

Figure 5:
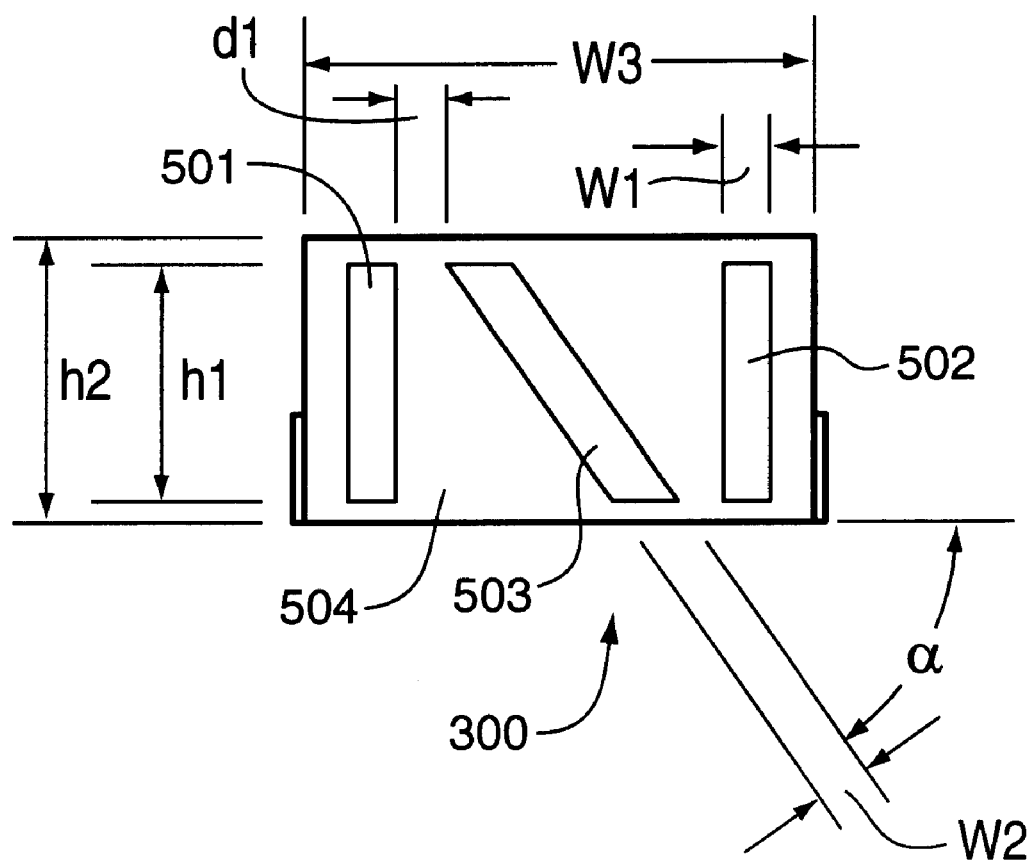
FIG. 5 depicts a diagram illustrating a calibration target, which can be implemented as a target in accordance with the present invention.

Referring now to FIG. 5, a diagram illustrating a calibration target, which can be implemented as calibration target 300 in FIG. 3, is depicted in accordance with the present invention. Position calibration target 300 comprises two elements, a background 504 and a plurality of positioning indicia 501–503 imprinted thereon. The positioning indicia 501–503 and the background 304 are selected to be easily distinguishable from each other to enable the line scan camera system to precisely delimit the plurality of positioning indicia 501–503 from the background 504. This is accomplished by the use of contrasting colors whose reflectivity is significantly different. An example of this would be the use of white positioning indicia 501–503 printed on a black background 504. The use of this difference in reflectivity simplifies the task of the line scan camera to delimit the position and boundaries of the plurality of positioning indicia 501–503. Alternatively, other methods that provide high contrast, such as, for example, light producing elements, may be used to produce the target.

As illustrated in FIG. 5, the plurality of positioning indicia 501–503 comprise a pair of parallel oriented, spaced apart, substantially rectangular bars 501 and 502, each of which has a first end and a second end with, for example, the first end being located at the top of FIG. 5 and the bottom end being located at the bottom of FIG. 5 for the purpose of this description. The third positioning indicia comprises diagonal bar 503 which is substantially parallelogram shaped and extends diagonally from the first end of indicia 501 to the second end of indicia 502 such that indicia 503 comprises a diagonal bar that can be used as described below to assist in the position determination process. Each of the parallel indicia 501, 502 is of substantially the same dimensions having a width W1 and a height H1 while the parallelogram shaped bar 503 has a width W2 and a height H1. The selection of exact values for these dimensions is a matter of design choice and is somewhat dictated by the selection of the line scan camera 460 used for the positioning determination. The overall target 500 has a width W3 and a height H2 such that the parallel oriented indicia 501, 502 extend substantially along the full height of target 500 while the diagonal indicia 503 traverses a significant portion of the width W3 of target 500. The parallelogram shaped indicia 503 as illustrated in FIG. 5 does not come in contact with either indicia 501 or 502 but is spaced apart therefrom by a distance D1 in order to provide three distinct indicia for positioning purposes. Optionally, indicia 503 can be joined at either end with indicia 501 and 502 to form a substantially N-shaped pattern on target 300. The parallelogram shaped indicia 503 is angled at an angle α from the horizontal as shown in FIG. 5.

Referring again to FIG. 4, one of the problems with the prior art targeting systems can be seen. Because both the robotic arm 110 and the storage cells 440 have targets 300' and 300, whose image must be captured by camera 460, the camera 460 must be located above (as depicted in FIG. 4) or below robotic arm 110 and positioned at an angle.

Figure 6:
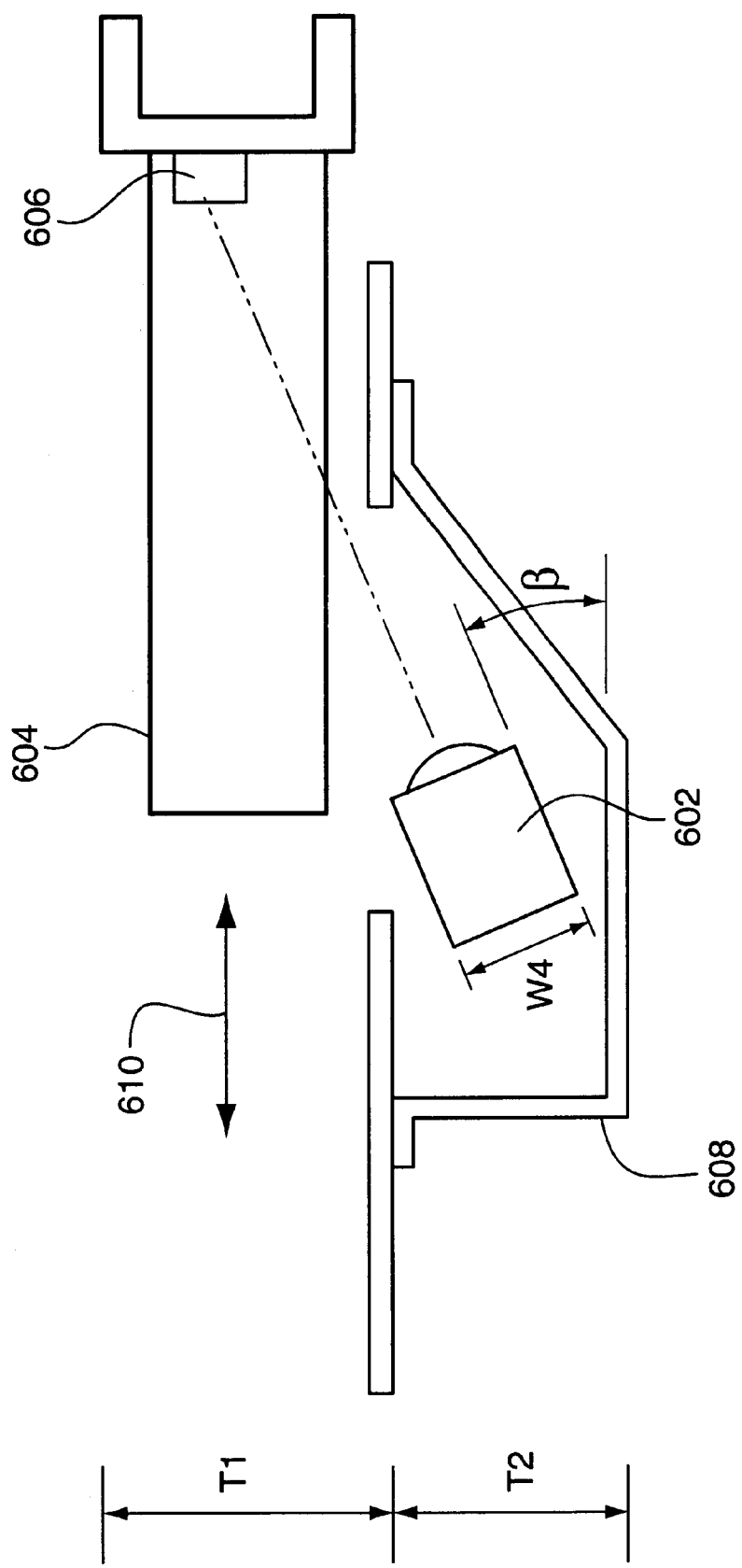
FIG. 6 depicts a side view schematic diagram of a prior art robotic arm and camera to aid in illustrating the problems with the prior art.

Referring now to FIG. 6, a side view schematic diagram of a prior art robotic arm and camera is depicted to aid in illustrating the problems with the prior art. In this view, the camera lens 602 is placed below the robotic arm 604. Robotic arm 604 has a thickness T1 determined in part by the dimensions of the tape cartridges and the storage cells. Camera lens 602 is placed at an angle β with respect to the direction of retrieval mechanism motion 610 such that when robotic arm 604 is not extended (robotic arm 604 is shown extended in FIG. 6) camera lens 602 may image the target on the library (not shown in FIG. 6, but similar to target 300 in FIGS. 3 and 4). When robotic arm 604 is extended (as shown in FIG. 6), camera lens 602 may capture the image of target 606 (target 606 is similar to target 300' in FIGS. 3 and 4).

However, the thickness T2 of camera housing 608 is larger than the width W4 because of the placement of camera lens 602 at an angle. This extra thickness of the combined robotic arm 604 and camera housing 608 decreased the number of storage cells 130 that library system 100 may contain for a given library system size. In the prior art as illustrated in FIG. 6, camera lens 602 is required to be oriented at an angle β because the position of robotic arm 604 as determined from the part of target 606 imaged by camera lens 602 is compared with the position of the tape cartridge as determined from the part of target 300 imaged by camera lens 602 when robotic arm 604 is not extended.

Figure 7:
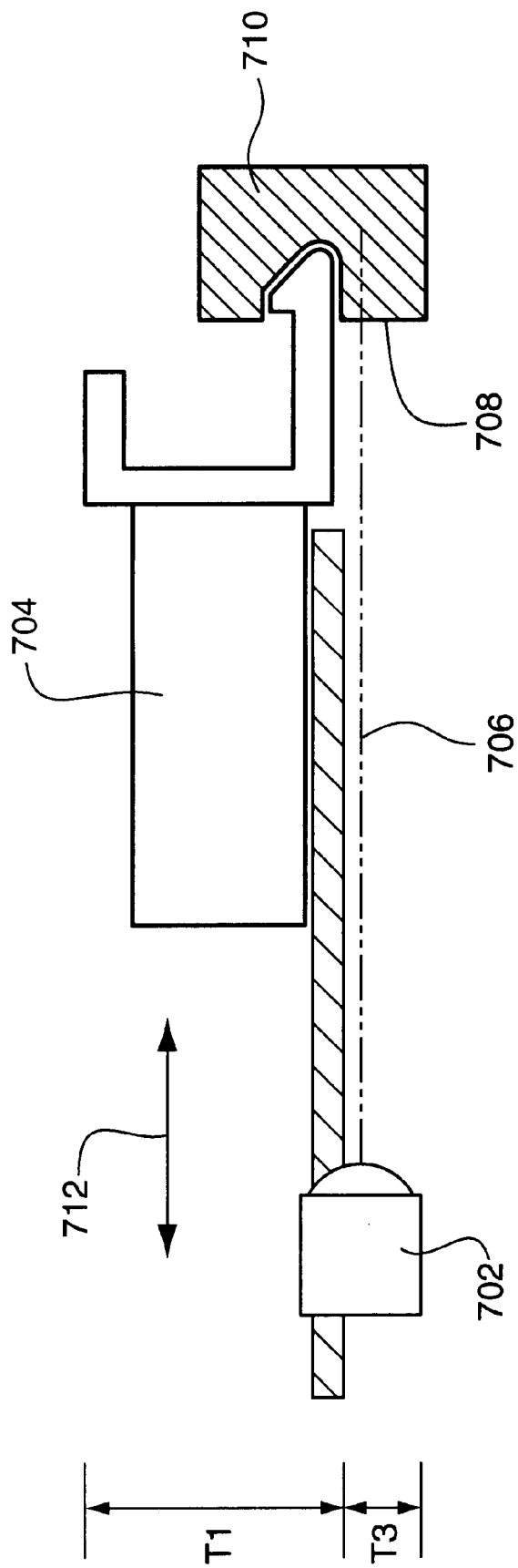
FIG. 7 depicts a schematic side view of a gripper mechanism and camera for calibration in accordance with a preferred embodiment of the present invention.

Referring now to FIG. 7, a schematic side view of a gripper mechanism and camera for calibration is depicted in accordance with a preferred embodiment of the present invention. The calibration system of the present invention includes a gripper mechanism 704, a camera lens 702, a calibration component 710, and a target 708. More information regarding a gripper mechanism, also referred to as a gripper or retrieval mechanism, can be found in U.S. Pat. No. 5,848,872 issued to Manes et al., which is hereby incorporated herein by reference for all purposes.

Camera lens 702 is not mounted at an angle with respect to the direction of retrieval mechanism motion as done in the prior art. Rather, camera lens 702 is oriented such that the line of sight 706 from the target 708 on calibration component 710 is parallel with the direction of retrieval mechanism motion 712. Thus the extra thickness T3 to gripper mechanism 704 introduced by camera lens 702 is reduced over the prior art, thus allowing more storage cells 130 to be placed into storage library 100 for a given library size than allowed by the prior art.

Figure 8:
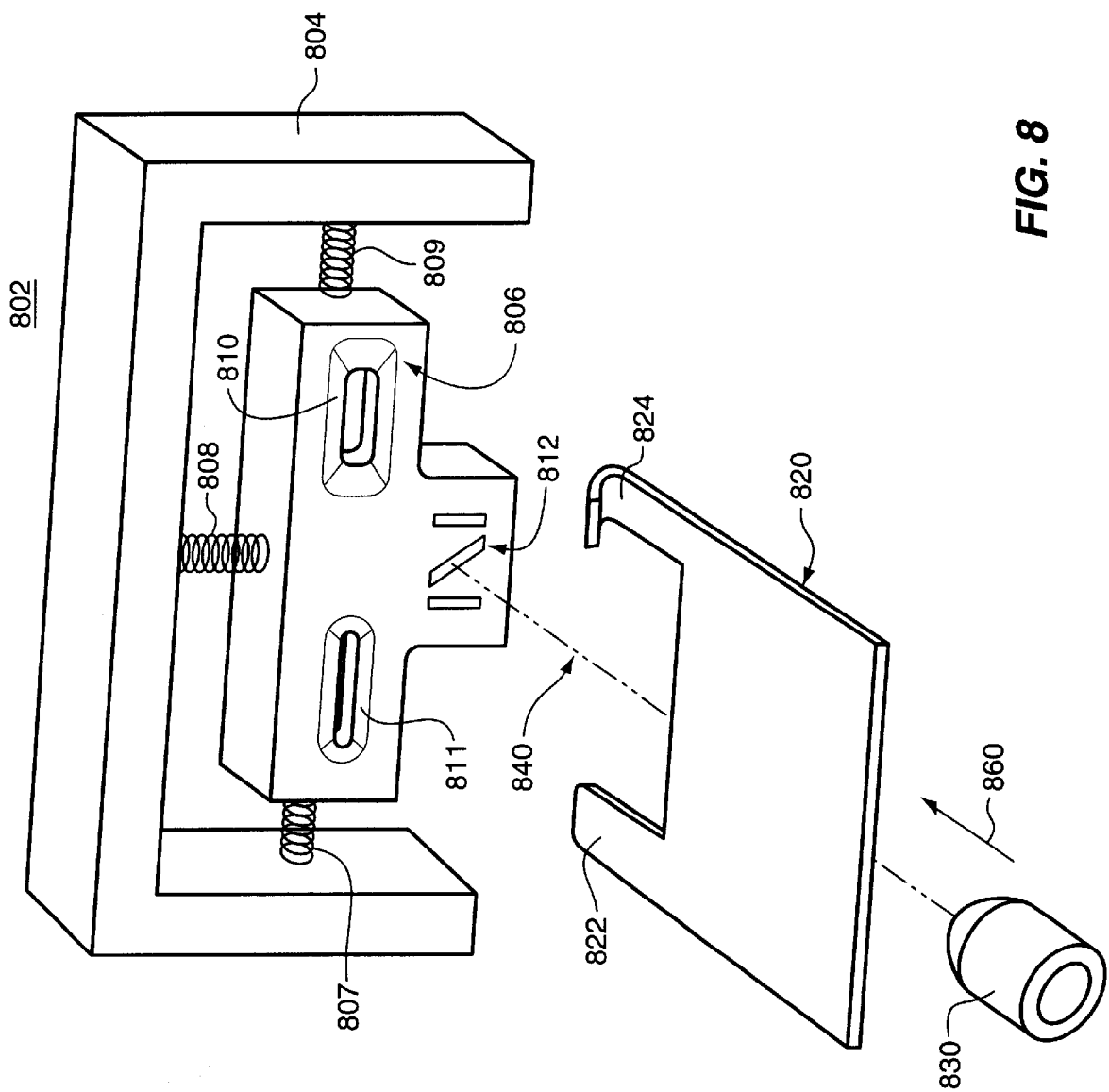
FIG. 8 depicts a perspective schematic view of a mechanical/vision self-alignment mechanism in accordance with the present invention.

Referring now to FIG. 8, a perspective schematic view of a mechanical/vision self-alignment mechanism is depicted in accordance with the present invention. For ease of illustration, only the tape retrieval component 820 and camera lens 830 portions of the gripping mechanism are depicted in FIG. 8. Preferably, camera lens 830 is a lens for a line scan camera. Calibration device 802 includes a fixed calibration block 804, a moveable calibration block 806, springs 807–809, funneled nesting features 810 and 811, and a target 812. Fixed calibration block 804 is stable and does not move.

Moveable calibration block 806 is attached to fixed calibration block 804 by means of springs 807–809 as depicted in FIG. 8, thus enabling calibration block 806 to be free to move in any direction within the plane formed by the three springs 807–809. The plane formed by the three springs 807–809 is substantially perpendicular to the principal direction 860 of retrieval component 820 movement. The principal direction 860 of retrieval component 820 movement is substantially parallel to the direction formed by the line of sight 840 from the camera lens 830 to the target 812.

Funneled nesting features 810 and 811 are configured to receive retrieval members 822 and 824. Retrieval members 822 and 824 are inserted into funneled nesting features 810 and 811 for calibration purposes. If the retrieval members 822 and 824 are not perfectly aligned with funneled nesting features 810 and 811, the insertion of retrieval members 822 and 824 will cause calibration block to move such that retrieval members 822 and 824 are completely inserted within funneled nesting features 810 and 811. This is because, since the nesting features 810 and 811 are funneled, if the retrieval members 822 and 824 are incorrectly aligned, the funneling action of the funnels will direct the retrieval members 822 and 824 into funneled nesting features 810 and 811. Thus, causing calibration block 806 to move in the process.

Figure 9:
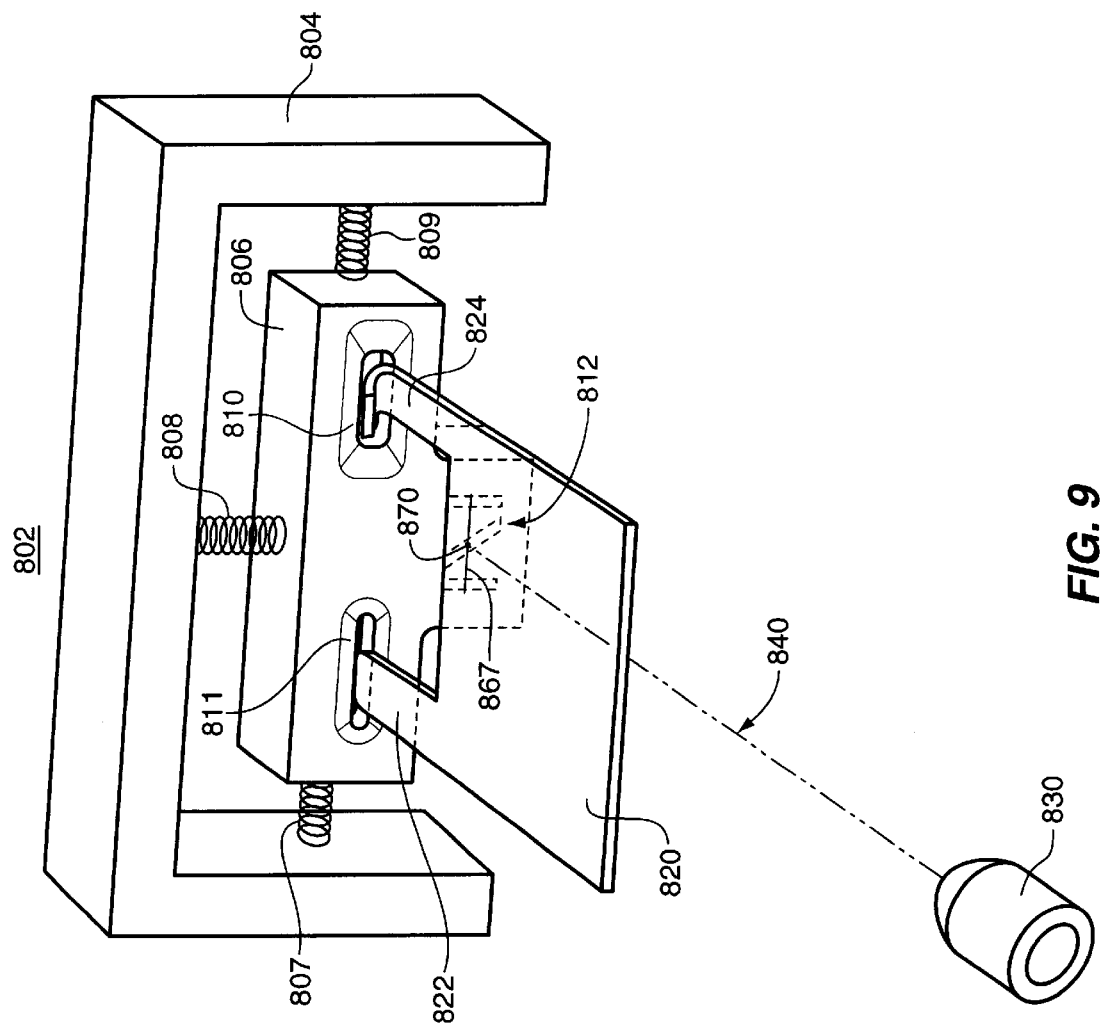
FIG. 9 depicts a perspective schematic diagram of the mechanical/vision self-alignment mechanism with the tape retrieval component extended into the calibration block in accordance with a preferred embodiment of the present invention.

Referring now to FIG. 9, a perspective schematic diagram of mechanical/vision self-alignment mechanism 800 with tape retrieval component 820 extended into the calibration block 806 is depicted in accordance with a preferred embodiment of the present invention. Nominally, the scan line generated by the camera is located on the center of target 812. However, if tape retrieval component 820 is not located at the nominal position, the calibration block 806 will have been moved by the insertion of retrieval components 822 and 824 into funneled nesting features 810 and 811. This movement can be detected by determining the location of the scan line 867 generated by the camera relative to target 812. By determining the location of the scan line relative to the target 812, the proper z and θ corrections can be determined to correct for the amount of distance calibration block 806 has been moved.

This calibration of the object retrieval mechanism allows the storage library and retrieval system to adjust for discrepancies that occur during the manufacturing process between the distance between the camera and the object retrieval mechanism from the nominal distance that these two objects should be spaced. All movements of the object retrieval mechanism within the storage library are calculated based on the retrieval mechanism being at this nominal distance from the camera, thus, if there is a discrepancy between the actual distance and the nominal distance, this discrepancy must be accounted for by the calibration. Since there should be no movement of the camera relative to the object retrieval mechanism after manufacturing, this calibration can take place in the factory before the robotic arm, which includes the object retrieval mechanism and the camera, is installed in the storage library at the user's site.

Once retrieval component 820 has been calibrated for a storage library system, no further calibration of the component is needed until and unless maintenance or modifications are made either to the storage library system 100 or to the retrieval mechanism 820. Because the camera lens 830 and associated camera electronics is not situated at an angle as in the prior art, the number of storage cells contained within a storage library system 100 of a given dimension may be increased.

To illustrate why this is so, consider a retrieval mechanism having a camera housed below it. If the camera is mounted at an angle as illustrated in FIG. 6 with camera lens 602, then the camera thickness T2 (the thickness taken up by the camera housing 608) is greater than the width W4 of the camera 602. Thus, an amount of space equivalent in height to camera thickness T2 cannot be utilized within the storage library system 100 for placing storage cells since retrieval component 820 will be unable to be lowered sufficiently within the storage library system 100 to enable it to retrieve a tape from a storage cell placed near the floor of the library 100.

However, utilizing the present invention within a storage library system 100, the amount of unusable space within storage library system 100 is reduced. This is because the camera housing width for the present invention is T3 (which is equivalent to the camera width W4), which is a value that is less than the camera housing thickness T2. Furthermore, only one calibration block 806 is needed for storage library system 100. Thus, the present invention provides for calibrating the retrieval component 820 while maximizing the space available within storage library system 100 for placing storage cells 130.

Furthermore, storage library systems in which no customer performed repairs or modifications to the components of the storage library system are envisioned may have the calibration block omitted entirely. In such a case, the calibration block would be located at the factory and the calibration in this case would be performed at the factory. Thus, storage library systems of this type will have even more space available for placing storage cells.

This space saving is critically important for businesses that need mass storage capability because space for placing these storage library systems is at a premium. Thus, the more storage cells that can be placed into a single storage library system results in more data that can be stored in the same amount of floor space and also reduces the number of storage library systems that a business needs to operate.

Figure 10:
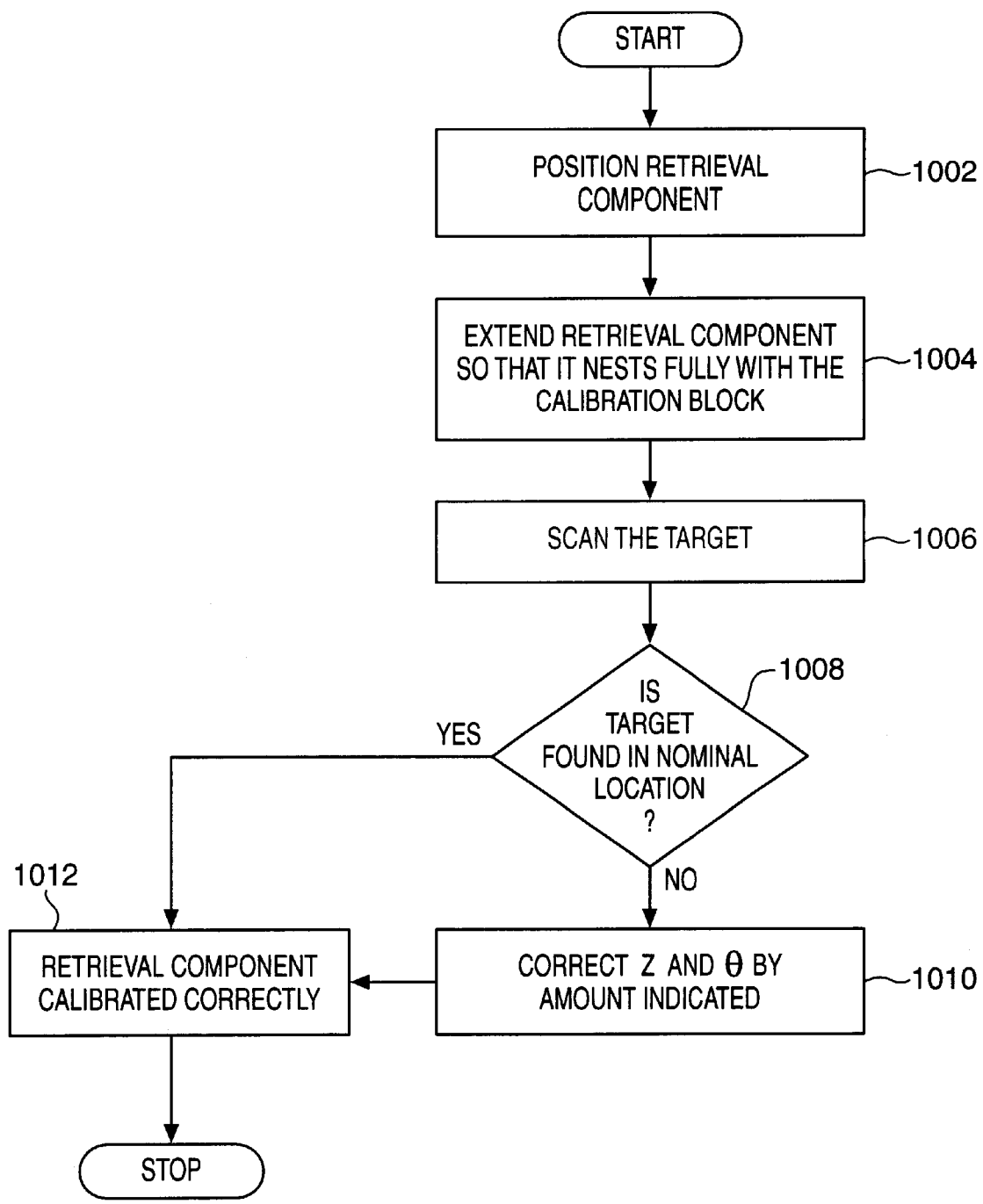
FIG. 10 depicts a flowchart illustrating a method of calibrating the retrieval component in accordance with the present invention.

Referring now to FIG. 10, a flowchart illustrating a method of calibrating the retrieval component 820 using a moveable calibration block is depicted in accordance with the present invention. The calibration of retrieval component 820 with respect to storage cells 130 is accomplished using camera lens 830 and N-shaped calibration target 812. First, the retrieval component 820 is positioned in front of calibration block 806 at a location such that retrieval members 822 and 824 will be able to nest with nesting features 810 and 811 on calibration block 806 (step 1002). Next, the retrieval component 820 is extended such that retrieval members 822 and 824 of retrieval component 820 fully nest with nesting features 810 and 811 of calibration block 806 (step 1004). The calibration block 806 is typically positioned such that when retrieval component 820 is extended such that retrieval members 822 and 824 are fully nested with funneled nesting features 810 and 811 under nominal conditions, the camera scan line will see the vertical center of target 812 and the horizontal center of target 812 is aligned with the center of the camera 830 field of view. If the retrieval component 820 is not perfectly calibrated, then calibration block 820 will move an amount and direction necessary to accommodate retrieval component 820. Once the retrieval members 822 and 824 have been fully nested with funneled nesting features 810 and 811 in calibration block 806, the calibration target 812 is scanned using camera lens 830 (step 1006). Next, it is determined whether target 812 is found in the nominal location (step 1008). If the target is found in the nominal location, then retrieval component 820 is properly calibrated and no adjustments are necessary (step 1012). If the target is not found in the nominal location, then the z and θ position of the retrieval component are adjusted by the amount indicated (step 1010) thus providing a correctly calibrated retrieval component (step 1012).

Since the storage cells are uniformly spaced in both the θ and z directions, the offset will be the same for each storage cell. Thus, when a data processing system requests an object from a specific storage cell 130, the controller moves the retrieval component 820 to that location by moving a predefined number of θ and z tachometer counts corresponding to the location of the specific storage cell 130 for the requested object. The controller then moves the retrieval component 820 an additional number of θ and z tachometer counts as determined by the calibration such that the retrieval component 820 will be aligned to efficiently and accurately retrieve the requested object.

In an alternative embodiment, calibration block 806 is not mounted on a moveable mount as illustrated in FIG. 8, but is instead fixed to the library structure. In this embodiment, springs 807–809 are replaced with fixed members that hold calibration block 806 in a fixed position. When the retrieval mechanism is inserted in the calibration block under nominal conditions, the camera will image the vertical center of the target and the horizontal center of the target is aligned with the center of the camera field of view. If the retrieval mechanism does not engage the calibration block at the nominal location, then, instead of the springs 807–809 allowing the calibration block to move with respect to the robot retrieval mechanism, the control system for the z and θ movement of the robotic system is adequately compliant to allow proper nesting to take place.

Figure 11:
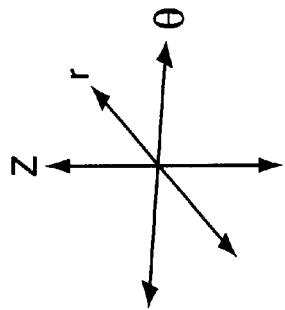
FIG. 11 depicts a cutaway pictorial diagram illustrating an alternate embodiment of a calibration block and retrieval component in accordance with the present invention.
Figure 11:
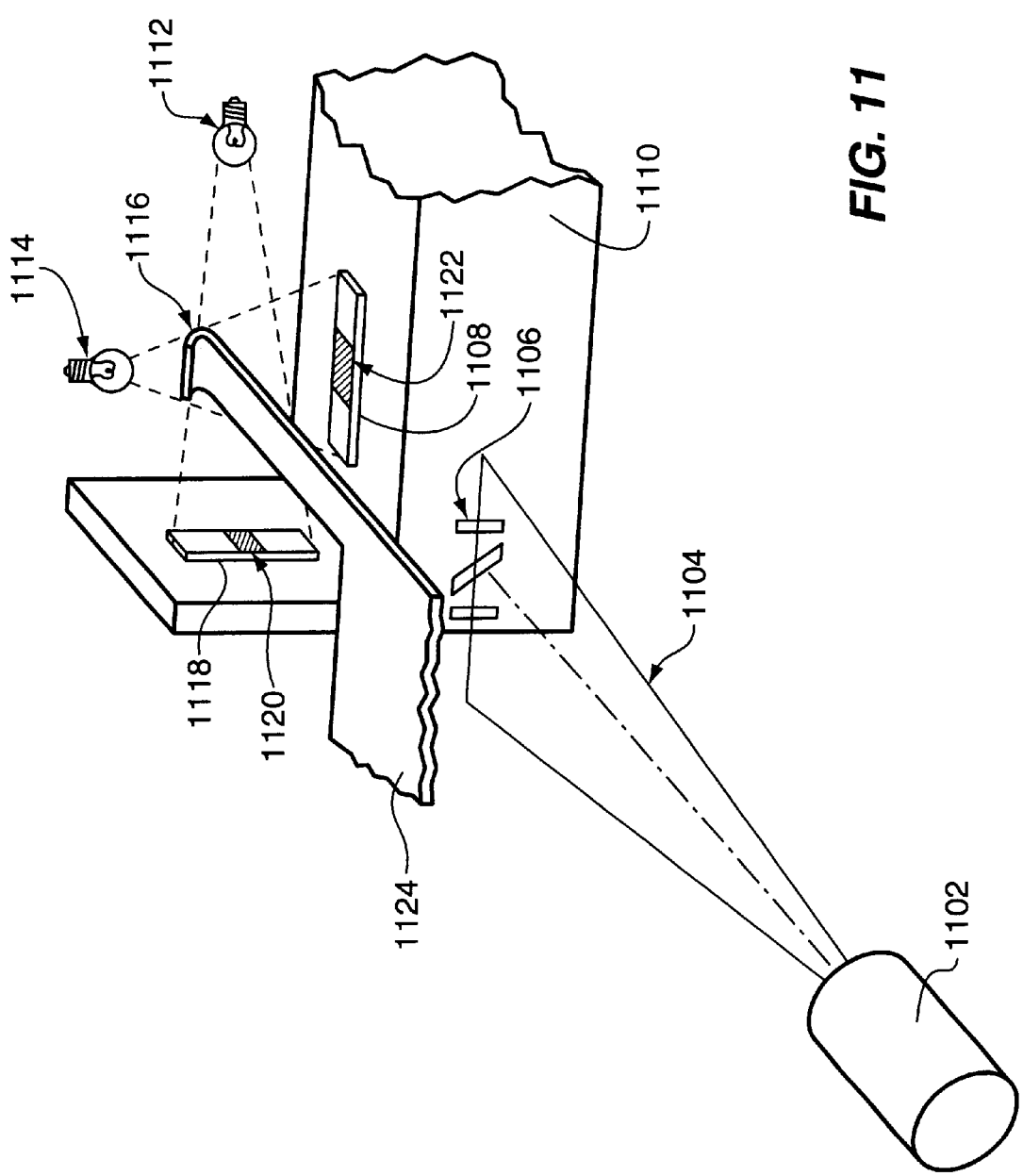

Referring now to FIG. 11, a cutaway pictorial diagram illustrating an alternate embodiment of a calibration block and retrieval component is depicted according to the present invention. In this embodiment, the calibration block 1110 includes a target 1106, a z position photo sensitive diode 1118, a z position light a θ position photo sensitive diode 1108 and a θ position light source 1114. Light sources 1112 and 1114 and position photo sensitive diodes 1108 and 1118 are mounted on a library structure such as, for example, library 100. The calibration apparatus is located such that the hook 1116 on the cartridge retrieval component 1124 can be extended into the calibration block 1110 during calibration.

When the hook 1116 is extended into the calibration block 1110, it shades a portion 1120 of z position sensitive photo diodes 1118 because it falls between light source 1112 and z position sensitive photo diodes 1118. Hook 1116, when extended into calibration block 1110, also shades a portion 1122 of θ position sensitive photo diode 1108 because it falls between light source 1114 and θ position sensitive photo diode 1108. The shaded areas 1120 and 1122 on the photo diodes 1118 and 1108 are translated into offsets from nominal in both z and θ directions via electronic circuitry (not shown) within the library storage unit (not shown).

The line scan camera assembly 1102 of the cartridge retrieval mechanism then reads the target 1106. A comparison of the target 1106 in the camera 1102 field of view 1104 in both z and θ directions is then made relative to the nominal value and a second set of z and θ offsets are determined. The hook offsets as determined by the position sensitive photo diodes 1108 and 1118 are subtracted from the camera 1102 offsets as determined by the target 1106 to determine the composite z and θ offsets for hand to camera calibration.

Camera 1102 is attached to the object retrieval mechanism at a fixed distance below cartridge retrieval component 1124 and the line of sight from camera to calibration block 1110 is substantially parallel to the direction of retrieval motion r of cartridge retrieval mechanism 1124. Thus, as discussed above, this allows for more storage cells to be included in a library storage system of a given dimension. Furthermore, as discussed above, the calibration may occur at the factory before the robotic arm, which includes cartridge retrieval mechanism 1124 and camera 1102, is delivered to the user's site for inclusion in a storage library system.

Although the embodiment illustrated in FIG. 11 has been described primarily with reference to using photo diodes and light sources to determine the location of the cartridge retrieval component 1124, other types of sensors could be used as well, such as, for example, ultrasonic sensors and proximity sensors.

It should be noted that in all embodiment of the present invention, the directions θ, z, and r are all substantially orthogonal to each other at the calibration block.

The present invention has been described primarily with reference to using an "N"-shaped target. However, other types of targets may be used as well such as, for example, a triangular shaped target. The present invention has also been described primarily with reference to utilizing a line-scan camera for imaging the target, but other types of cameras, imaging systems and devices may utilized as well and are within the spirit and scope of the present invention.

Furthermore, although primarily described with reference to retrieval and storage of tape cartridges for use in a data processing system, the present invention is also applicable to other types of computer readable media that may be stored in a storage library system such as, for example, compact discs (CDs) and digital video discs (DVDs) (also known as digital versatile discs). It should also be noted that the present invention is not limited to use with storage of computer readable media devices but may be utilized with storage of other objects for which quick retrieval of such is desirable.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A calibration apparatus for use with a storage system for storing a plurality of objects in an array of object storage locations, comprising:
   an object retrieval mechanism for retrieving objects from said object storage locations;
   a calibration block moveably attached to said storage system, having at least one nesting feature for engaging a portion of said object retrieval mechanism and having a target; and
   an imaging system attached to said object retrieval mechanism for capturing an image of a portion of said target for use in calibrating said object retrieval mechanism.

2. The calibration apparatus as recited in claim 1, wherein said object retrieval mechanism has a principal direction of movement, said calibration block is free to move in any of two orthogonal directions, and the two orthogonal directions are both substantially perpendicular to the principal direction of movement.

3. The calibration apparatus as recited in claim 1, wherein said calibration block is moveably attached to said storage system with a plurality of springs.

4. The calibration apparatus as recited in claim 1, wherein a direction from said target to said imaging system is substantially parallel to said principal direction.

5. The calibration apparatus as recited in claim 1, wherein an offset by which said retrieval component needs to be adjusted for proper calibration is obtained based the position of the target relative to a scan line generated by the camera as compared to a nominal position of the target.

6. The calibration apparatus as recited in claim 1, wherein the imaging system comprises a camera.

7. The calibration apparatus as recited in claim 1, wherein the imaging system comprises a line scan camera.

8. The calibration apparatus as recited in claim 1, wherein said target is an "N"-shaped target having a first stripe, a second stripe parallel to said first stripe, and a middle stripe positioned diagonally between said first stripe and said second stripe, said first, middle and second stripes being aligned in a horizontal direction.

9. The calibration apparatus as recited in claim 1, wherein said target is a triangular shaped target.

10. The calibration apparatus as recited in claim 1, wherein said imaging said target produces an imaged target, which is analyzed to determine a vertical offset of said object retrieval mechanism with respect to a given one of said plurality of object storage locations.

11. The calibration apparatus as recited in claim 1, wherein said imaging said target produces an imaged target which is analyzed to determine a vertical offset of said object retrieval mechanism with respect to a given one of said objects.

12. The calibration apparatus as recited in claim 1, wherein each of said plurality of object storage locations is configured to hold a tape cartridge for use in a data processing system.

13. A method of calibrating a object retrieval mechanism for use in a object storage library, comprising the steps of:
    inserting at least a portion of the object retrieval mechanism into a moveable calibration block;
    obtaining an image of the target after said inserting step; and
    using the position of the target in the image as compared to a nominal position to calculate an offset by which the object retrieval mechanism must be adjusted when retrieving an object from the object storage library.

14. The method as recited in claim 13, wherein the target is an "N"-shaped target having a first stripe, a second stripe parallel to said first stripe, and a middle stripe positioned diagonally between said first stripe and said second stripe, said first, middle and second stripes being aligned in a horizontal direction.

15. The method as recited in claim 13, wherein the objects are tape cassettes for use in a data processing system.

16. The method as recited in claim 13, wherein the object retrieval mechanism is a robotic arm.

17. The method as recited in claim 13, wherein the obtaining an image step is performed using a camera.

18. The method as recited in claim 17, wherein the camera is a line scan camera.

19. The method as recited in claim 18, wherein the images are line scans.

* * * * *